(12) United States Patent
Weiler et al.

(10) Patent No.: US 12,537,677 B1
(45) Date of Patent: Jan. 27, 2026

(54) ONE-TIME KEY DERIVATION

(71) Applicant: Idaho Scientific LLC, Boise, ID (US)

(72) Inventors: Andrew James Weiler, Nampa, ID (US); Nathan Charles Chrisman, Nampa, ID (US)

(73) Assignee: Idaho Scientific LLC, Boise, ID (US)

( * ) Notice: Subject to any disclaimer, the term of this patent is extended or adjusted under 35 U.S.C. 154(b) by 0 days.

(21) Appl. No.: 19/187,708

(22) Filed: Apr. 23, 2025

(51) Int. Cl.
 *H04L 9/08* (2006.01)

(52) U.S. Cl.
 CPC ............ *H04L 9/0861* (2013.01); *H04L 9/085* (2013.01); *H04L 9/0891* (2013.01)

(58) Field of Classification Search
 None
 See application file for complete search history.

(56) References Cited

U.S. PATENT DOCUMENTS

| | | | | |
|---|---|---|---|---|
| 7,925,013 | B1 * | 4/2011 | Washington | G06F 21/78 380/278 |
| 10,491,576 | B1 * | 11/2019 | Pfannenschmidt | H04L 9/14 |
| 12,360,919 | B1 | 7/2025 | Weiler et al. | |
| 2016/0104009 | A1 * | 4/2016 | Henry | G06F 9/30189 713/190 |
| 2019/0109715 | A1 * | 4/2019 | Hars | H04L 9/0637 |
| 2019/0319781 | A1 | 10/2019 | Chhabra et al. | |
| 2020/0183922 | A1 * | 6/2020 | Lim | G11C 11/412 |
| 2020/0403771 | A1 * | 12/2020 | Satpathy | H04L 9/0631 |
| 2024/0007283 | A1 * | 1/2024 | Chen | H04L 9/0861 |
| 2024/0291635 | A1 | 8/2024 | Morshed et al. | |

OTHER PUBLICATIONS

Congwu Li, Le Guan; Mimosa: Protecting Private Keys Against Memory Disclosure Attacks Using Hardware Transactional Memory; IEEE: year: 2015; pp. 1196-1213.
Examiner Interview Summary Record received for U.S. Appl. No. 18/633,206, mailed on Mar. 20, 2025, 2 pages.
Non-Final Office Action received for U.S. Appl. No. 18/633,206, mailed on Nov. 8, 2024, 15 pages.
Notice of Allowance received for U.S. Appl. No. 18/633,206, mailed on Apr. 1, 2025, 10 pages.

* cited by examiner

*Primary Examiner* — Bassam A Noaman
(74) *Attorney, Agent, or Firm* — Workman Nydegger (57) ABSTRACT

A system for generating keys comprises a plurality of share selecting modules, each module containing multiple storage buffers connected to a selector. For a given key mixing operation, the selector chooses a key share stored in one of the buffers. A bit-wise XOR gate is connected to the share selecting modules and is configured to bit-wise XOR all selected key shares to generate a mixed key on its output.

19 Claims, 8 Drawing Sheets

ONE-TIME KEY DERIVATION

BACKGROUND

Background and Relevant Art

Computers and computing systems have affected nearly every aspect of modern living. Computers are generally involved in work, recreation, healthcare, transportation, entertainment, household management, etc.

Computer memory can be encrypted using a runtime encryption key (i.e., an encryption key used during runtime of the data and/or instructions stored in the memory) and an encryption process. In particular, data or instructions stored in memory are stored as digital blocks in an encrypted format. In particular, clear text data or instructions are used as (at least a portion of) input data or instructions into an encryption process. The input data or instructions are encrypted using the encryption process applying the runtime encryption key to the input data or instructions to create an encrypted output digital block. The encrypted output digital block is then stored in memory, such that the encrypted output digital block stored in memory is not readable absent access to the runtime encryption key.

In conventional AES GCM encryption, a key is used to encrypt an arbitrary number (often referred to as an initialization vector (IV)) to produce a cypher block (which in some embodiments is an encrypted number). The cypher block is then bit-wise XORed with plaintext to produce cypher text.

When a same key and initialization vector are used for more than one set of data, the key can be discovered and the data (or instructions) compromised. One way to avoid this is to include a nonce field in the initialization vector where the nonce field is changed for each encryption. One simple way of doing this is using a write counter as the nonce in the nonce field. This makes the initialization vector unique and allows for using a common key for multiple encryptions.

In spite of care taken to ensure data and/or instruction are not compromised, side-channel attacks can nonetheless compromise data and/or instructions. Side-channel attacks are a type of attack that exploit indirect information leaked by a system rather than targeting the system's code or algorithms directly. These attacks gather extra information based on the way a computer protocol or algorithm is implemented. Examples of such information include timing data, power consumption, electromagnetic leaks, and sound.

Some side-channel attacks depend on the strength of the side-channel signal and a number of samples with varied AES data. Some existing systems mitigate these attacks by strongly reducing the side-channel signal. For example, characterization of a base system without countermeasures shows leakage at approximately 10K samples while a protected system with reduced side-channel signal might be several orders of magnitude higher.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

A system for generating keys comprises a plurality of share selecting modules, each module containing multiple storage buffers connected to a selector. For a given key mixing operation, the selector chooses a key share stored in one of the buffers. A bit-wise XOR gate is connected to the share selecting modules and is configured to bit-wise XOR all selected key shares to generate a mixed key on its output.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Rather than using a unique number encrypted by a key and then bit-wise XORing the cypher block with plaintext data, embodiments illustrated herein instead use a unique key per encryption. Ordinarily, using a unique key per encryption would be an expensive operation in terms of generating the keys and storing the keys if the keys had to be uniquely created and stored at the scale to be useful. Therefore, embodiments herein use a process of mixing parts from a more limited set of shares (similar in form to keys, but not specifically used as encryption keys) to reduce the storage and generation requirements. That is, parts from key shares in a limited set of stored key shares can be mixed and matched to create a much larger number of generated keys (e.g., 6 to 10 orders of magnitude larger number of generated keys as compared to a number of stored keys). Note that the generated keys do not need to be persistently stored inasmuch as they can be regenerated using the much smaller number of stored keys. Thus, storage resources can be conserved by storing a minimal number of keys that can be used to generate a much larger number of keys that do not need to be stored persistently.

Figure 1A:
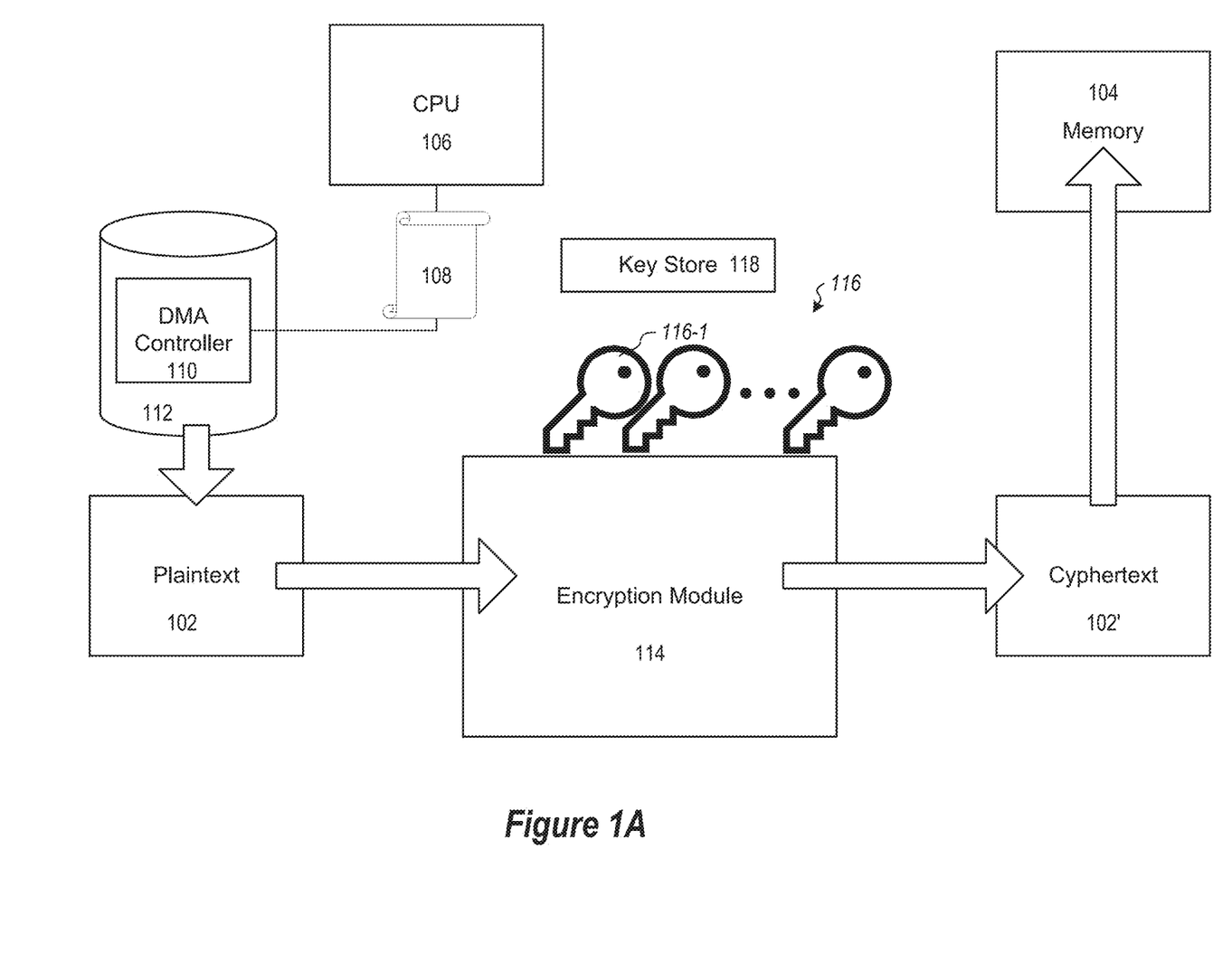
FIG. 1A illustrates an example where plaintext is encrypted to create ciphertext, which is then stored in memory.

Referring now to FIG. 1A, an example is illustrated. FIG. 1A illustrates an example where plain text 102 will be encrypted to create ciphertext 102', which is then stored in memory 104. In the example illustrated in FIG. 1A, the CPU 106 sends a message 108 to a DMA controller 110 in a storage system 112, indicating that the data (or instructions) stored as plain text 102 should be stored in memory 104. Typically, the message 108 will include an indication of where the data should be stored in the memory 104 by identifying an address in the memory 104. The DMA controller 110 directs the plain text 102 to an encryption module 114. The encryption module 114 may comprise, for example, a software application running on computer hardware. Alternatively, the encryption module may comprise specialized hardware, such as an application specific integrated circuit (ASIC) or other special purpose hardware configured to encrypt data and/or instructions. A key 116-1 is used by the encryption module 114 to encrypt the plain text to create the ciphertext 102'.

In the example illustrated in FIG. 1A, the key 116-1 is selected from a plurality of key shares 116 stored or generated at the key store 118. A unique key is used for each storage operation to create the cipher text 102' which is then stored in memory 104. This helps to prevent certain types of attacks from discovering keys used to encrypt data stored in memory 104.

As noted previously, if a new key had to be stored for every memory operation, then an extremely large number of keys would need to be stored to make the system useful. Therefore, embodiments can instead store a limited number of key shares and use a mixing process to create a much larger number of keys. For example, in one embodiment, using 64 key shares, embodiments can generate 232 unique keys.

Figure 2:
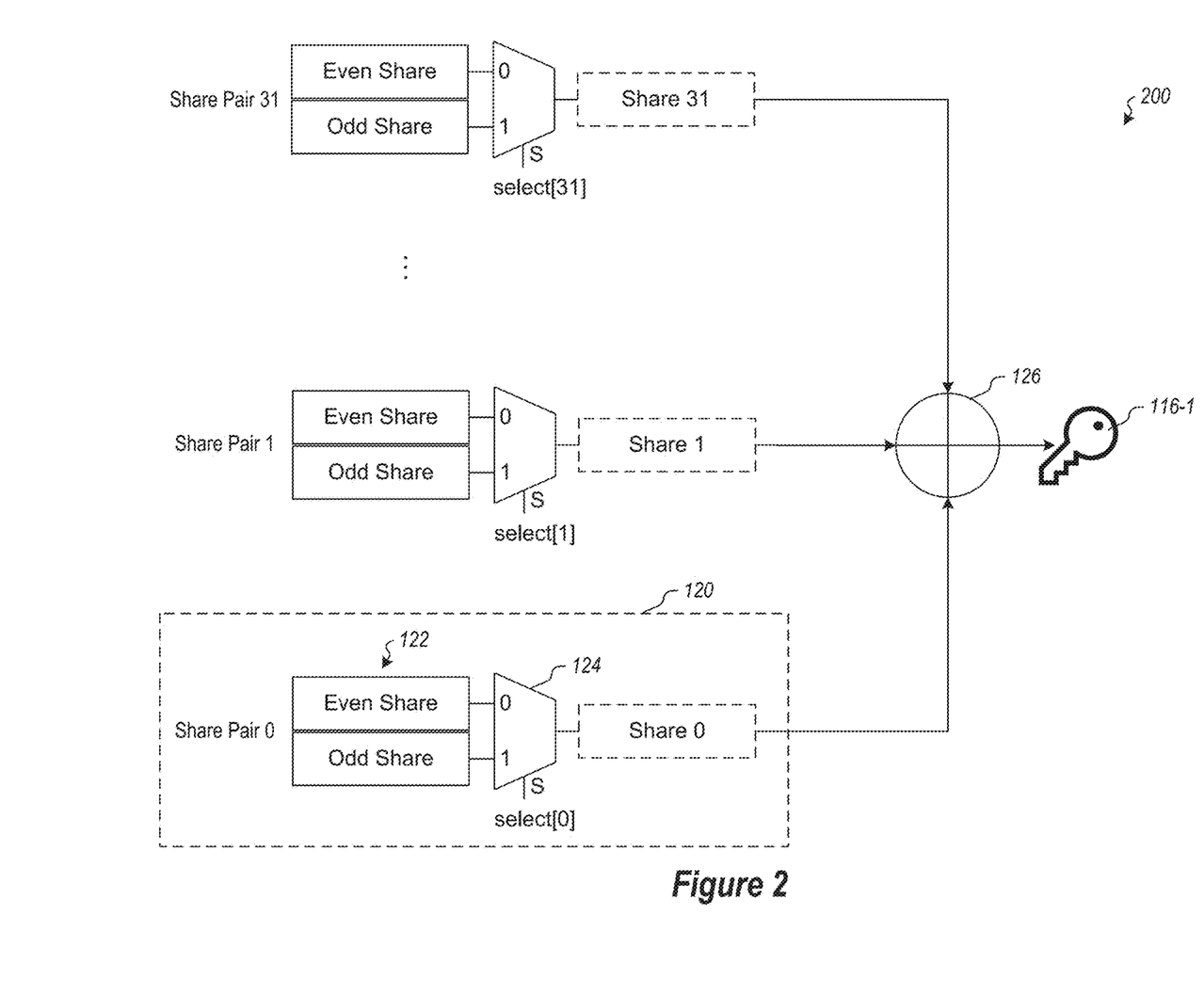
FIG. 2 shows a key generator which includes a plurality of share selecting modules.

Additional details are illustrated with reference to FIG. 2. FIG. 2 illustrates a key generator 200 which includes a plurality of share selecting modules as represented by the share selecting module 120. In some embodiments, the key generator may be included in the key store 118. Each share selecting module includes a plurality of storage buffers. For example, share selecting module 120 includes storage buffers 122. Storage buffers may be, for example: registers, queues, etc.

In this example, the share selecting module 120 includes two storage buffers shown as storage buffers 122. Note that in other embodiments, three or more storage buffers may be used. In the present example, the storage buffers are labeled as an even share and an odd share. Each storage buffer, in the present example, stores a key share. A key share, in this example, is simply a bit binary number, such as for example, a 128-bit, 192-bit, or 256-bit binary number.

In some embodiments, each key share is generated using a random number generator as a True Random Number Generator used to generate high quality unpredictable random numbers for cryptographic key generation.

Each share selecting module further includes a selector illustrated by selector 124. In some embodiments, the selector 124 is a multiplexer that selects either the even share or the odd share in the storage buffers depending on a value of a control bit input into the select input, such that the output of the selector is the selected share. One share is selected by each of the share selecting modules. As will be illustrated in more detail below, various modalities can be used for selecting keys. In some examples, a 32-bit address can be used to select keys where each different bit of the address is used by a different share selecting module. The 32-bit address may be an address to which data being encrypted by the key 116-1 will be stored. Alternatively, a nonce, such as a nonce generated by a write counter, may be used to select the various shares by the share selecting modules.

FIG. 2 further shows a bit-wise XOR gate 126 coupled to the share selecting modules. The bit-wise XOR gate 126 bit-wise XORs all of the shares selected by the 32 share selecting modules to create a key 116-1. The key 116-1 can then be used by the encryption module 114 to encrypt plaintext 102 (which may be instructions or data) to cyphertext 102' which can then be stored in the memory 104.

Figure 3:
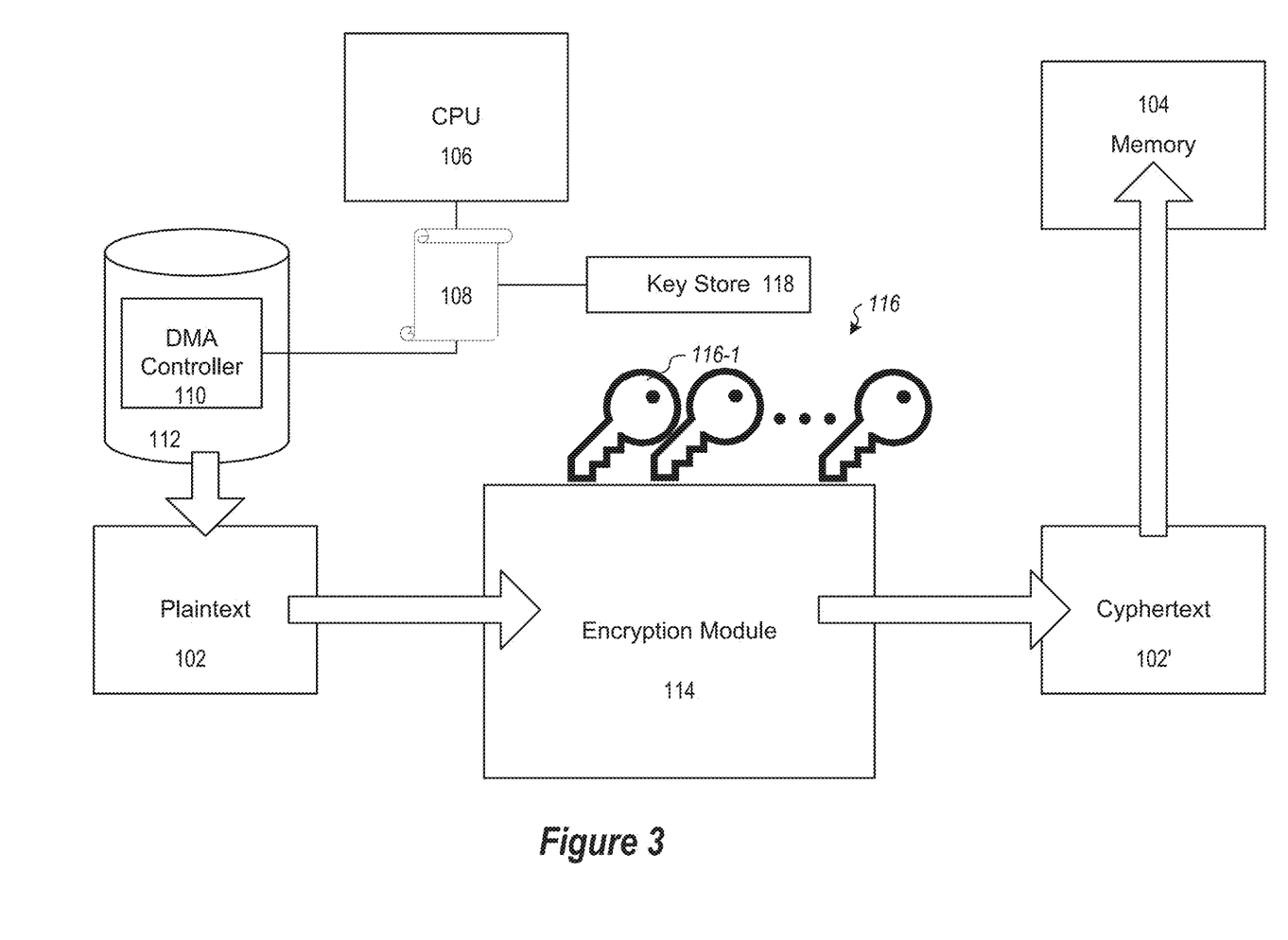
FIG. 3 illustrates how a memory storage address can be used for selecting a key

Referring now to FIG. 3, additional details are illustrated showing how a memory storage address can be used for selecting a key. FIG. 3 illustrates that the key store 118 has access to the message 108 sent from the CPU 106 to the DMA controller 110. The key store 118 includes the key generator 200 from FIG. 2. The message 108 includes a 32-bit address (or 32 bits of an address) in memory 104 where the cyphertext 102' will be stored. The 32 bits of the 32-bit address can be used where each of the bits is used as a different control bit input into the select input for a different selector to select either an even or an odd share. Once the selected shares are bit-wise XORed to produce the key 116-1, the key 116-1 is provided to the encryption module 114 where it is used to encrypt the plaintext 102 to cyphertext 102', which is then stored in the memory 104 by the DMA controller 110.

Figure 4:
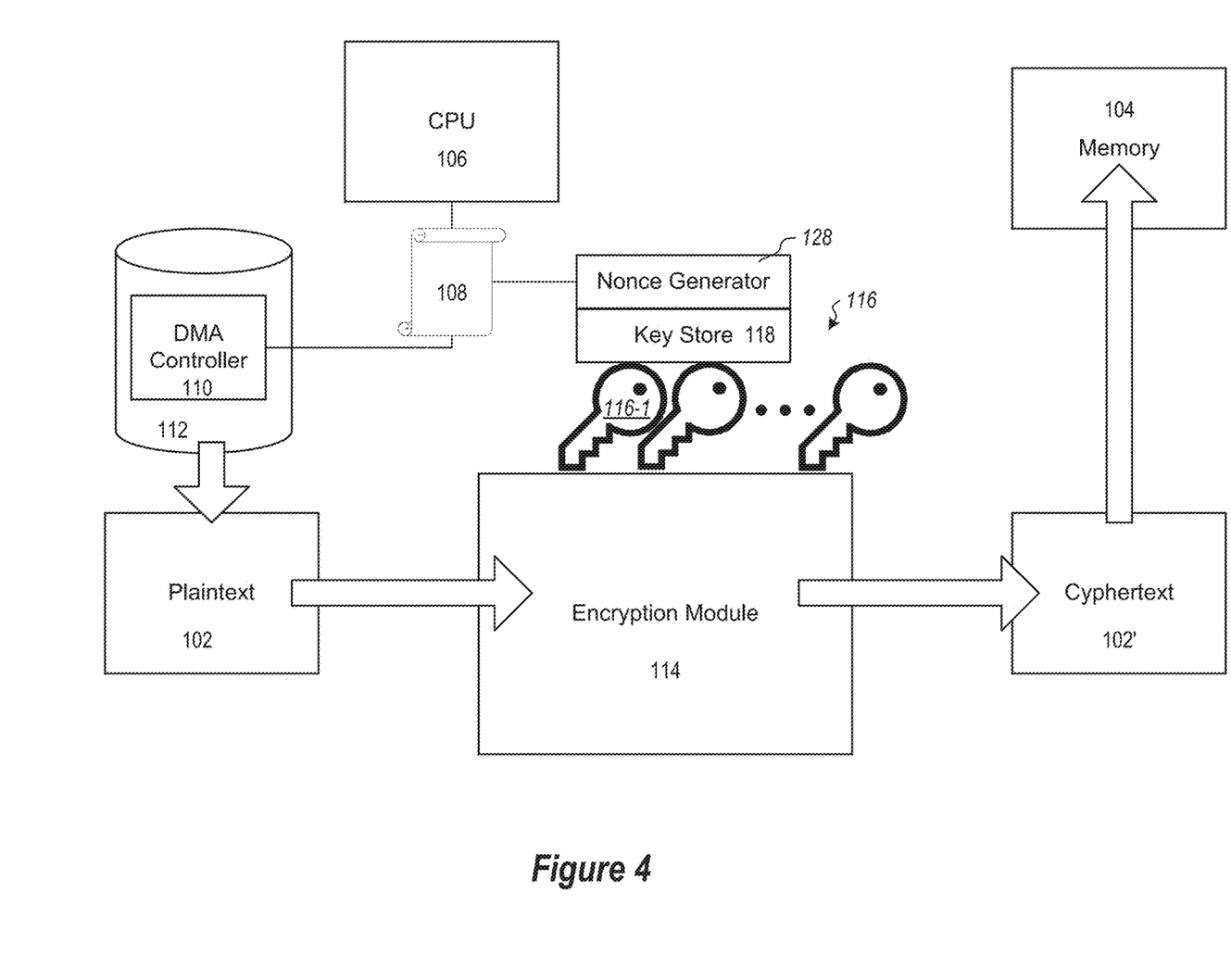
FIG. 4 shows a nonce generator used to generate control bits for the select inputs of the selectors of the key generator.

In an alternative example illustrated in FIG. 4, a nonce generator 128 can be used to generate the control bits for the select inputs of the selectors of the key generator 200. For example, in some embodiments, a write counter may be used as a nonce generator 128 to generate 32 control bits for the inputs to the select inputs of the various share selecting modules in the key generator 200. A write counter, in some embodiments, is a counter that increments (or decrements) based on a write of data and/or instructions to memory 104. For example, the nonce generator 128 may increment or decrement each time a write message is sent to the DMA controller 110. Alternatively, the nonce generator 128 may increment or decrement each time data or instructions are written to memory 104.

Alternatively, the nonce generator 128 may be an encryption counter that increments or decrements in the context of each encryption operation. For example, in some embodiments, the nonce generator 128 increments or decrements each time data or instructions are encrypted by the encryption module.

Use of the nonce generator 128 forces a new key to be used with each write. Once all nonces have been used to generate a key, the nonce counter will reset (typically to 0 in the case of an incrementing nonce) and new shares are generated, such as by using a True Random Number Generator and stored in the storage buffers. In this example, a given nonce is stored and is associated with the cyphertext 102' stored in the memory 104 so that the key 116-1 can be regenerated to decrypt the cyphertext 102' when time comes to read data or execute instructions in the cyphertext 102'.

Note that embodiments may be used within systems implementing a transparent key-roll. One such system is described in U.S. patent application Ser. No. 18/633,206 titled COMPUTER SYSTEM FOR TRANSPARENT KEY-ROLL filed on Apr. 11, 2024 and issued as U.S. patent Ser. No. 12/360,919 on Jul. 15, 2025, which application is incorporated herein by reference in its entirety. In particular, the system described provides a transparent step-wise key-roll mechanism that "races" to refresh keys prior to nonce value exhaustion. For example, in a memory encryption environment, acts for rolling encryption within a memory region may be performed. Data is stored in a first encrypted memory portion in the memory region. The data in the first encrypted memory portion is encrypted to a first runtime encryption key. Data is stored in a second encrypted memory portion in the memory region. The data in the second encrypted memory portion is encrypted to a second runtime encryption key. A pointer is stored. The pointer defines a boundary between the first encrypted memory portion and the second encrypted memory portion. The first encrypted memory portion and second encrypted memory portion are both configured to be accessible together to entities external to the memory to provide data stored in the first encrypted memory portion and second encrypted memory portion.

However, embodiments identify occurrence of an event indicating that a memory slot indicated by the pointer should have its key-rolled from the first runtime encryption key to the second runtime encryption key. Such an occurrence can be an expiration of an amount of time or a number of writes having been performed on the memory region. In some embodiments, the certain number of writes is a number of writes that is no more than ½ of a number of writes to wear out the first runtime encryption key or the second runtime encryption key. In some embodiments, the certain number of writes is a number of writes that is based on a statistical probability of wearing out the first runtime encryption key or the second runtime encryption key. In some embodiments, the certain number of writes is a number of writes is based on encryption of the memory region using an incrementable nonce. In some embodiments, the certain number of writes is variable. In some embodiments, the certain number of writes is variable based on results of nonce preservation operations.

In any case, when the event occurs, slot data (or instructions) in the slot is read using the first runtime encryption key; the slot data (or instructions) is written to the slot using the second runtime encryption key; and the pointer is moved such that the slot is in the second encrypted memory portion.

Figure 5:
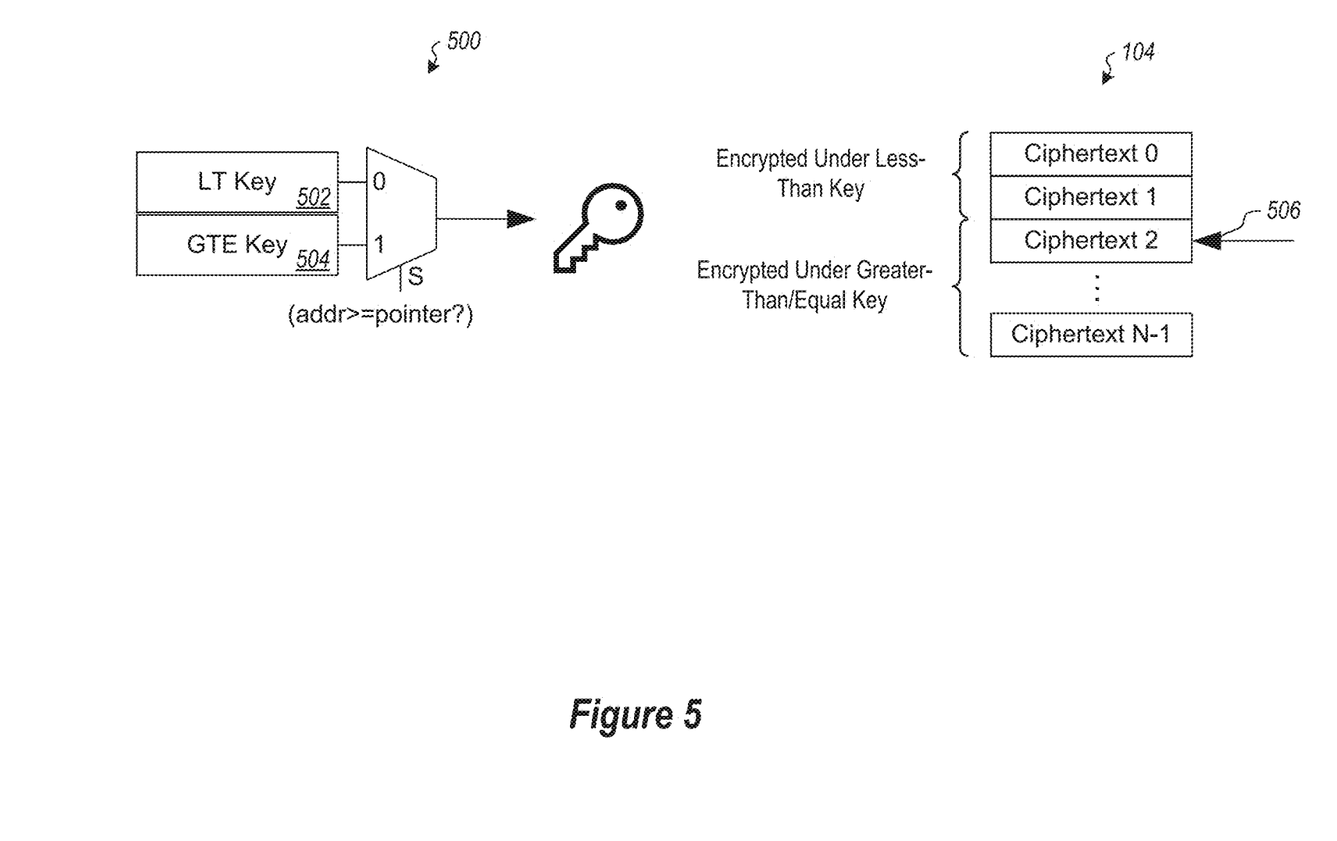
FIG. 5 illustrates a simplified example of a key-roll key selection system.

FIG. 5 illustrates a simplified example of a key-roll key selection system 500. In particular, FIG. 5 illustrates a first key 502, which in this example is a less-than key existing in parallel with a second key 504, which in this example is a greater-than/equal key which may be stored in registers, queues, or other storage. A pointer 506 indicates a boundary of memory 104 encrypted under the less-than key 502 (which is the newer key of the two keys, in this scenario) and the greater-than/equal key 504 (the older key of the two keys, in this scenario). Every N increments of the nonce (or other event as discussed above), a single key-roll step is performed. Each key-roll step includes: (1) reading the ciphertext under the greater-than/equal key 504; (2) incrementing the key-roll pointer; and (3) writing the ciphertext under the less-than key 502. During the final key-roll step for a given greater-than/equal key, where the pointer is already at the end of memory, the less-than key 502 replaces the greater-than/equal key 504 and a new fresh key replaces the less-than key 502. If an attempt is made to read or write to an address, an appropriate key can be selected using the key-roll key selection system 500 such that the appropriate key is used to read or write data (or instructions).

Figure 6:
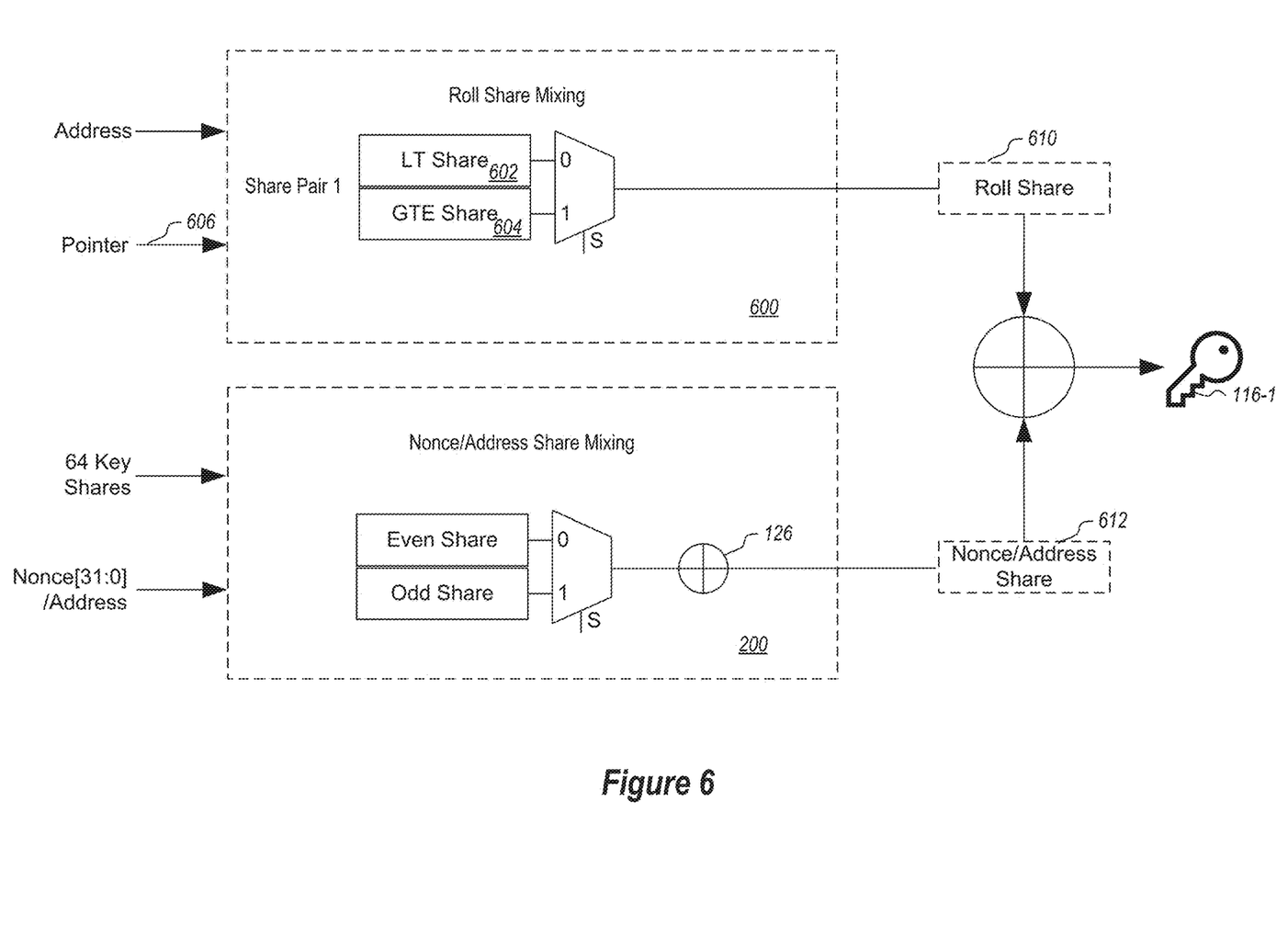
FIG. 6 illustrates a key-roll share selection system which produces a roll share by selecting between a first key-roll share and a second key-roll share.

The principles of the transparent key-roll system described above can be applied directly with nonce-mixed or address-mixed shares by treating a process similar to selecting between the less-than key and the greater-than/equal key as another share selection. Attention is now directed to FIG. 6, which illustrates an example. In this example, key-roll share selection system 600 (which in some embodiments is included in the key store 118) is illustrated and produces a roll share 610 by selecting between a first key-roll share 602 (illustrated as a less-than share) and a second key-roll share 604 (illustrated as a greater-than/equal key-roll share). The output of the key generator 200 is XORed with the output of a key-roll key selection system 600 to produce the key 116-1, which can be used to encrypt plaintext 102 into cyphertext 102' for storage in the memory 104 or to read from a memory location. Note that as with previously described embodiments, the key generator 200 (as shown in a simplified form in FIG. 6) can use as inputs a nonce or an address to select shares.

The key-roll share selection system 600 receives as input an address where a write is occurring and a memory pointer 606 that identifies which key-roll share was used to create the key 116-1.

Figure 1B:
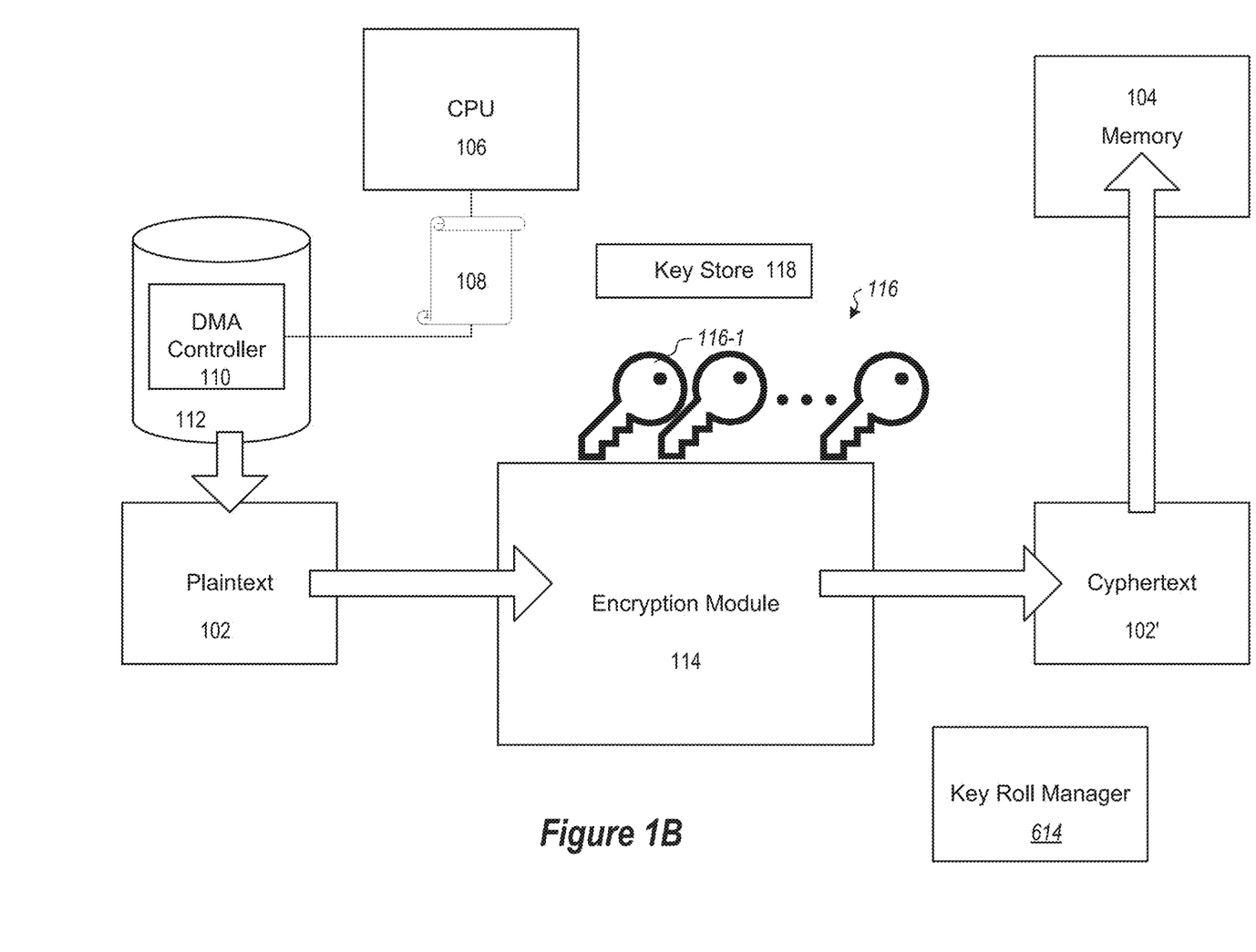
FIG. 1B illustrates using a key-roll manager to roll encryption keys.

Note that key-rolling can be performed similarly to what is illustrated in FIG. 5, except that each key-roll step includes a key-roll manager 614 (see FIG. 1B): (1) reading the ciphertext 102' from memory 104 using a key from the key store 118 created with the second key-roll share 604 XORed with the appropriate intermediate share 612 (which in this example is shown as a nonce based or address based share); (2) incrementing the key-roll memory pointer 606; and (3) writing the updated ciphertext 102' back to memory 104 using a key from the key store 118 created using the first key-roll share 602 XORed with the appropriate intermediate share 612. The key-roll manager may be a specialized hardware device programmed to perform the illustrated functions.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 7:
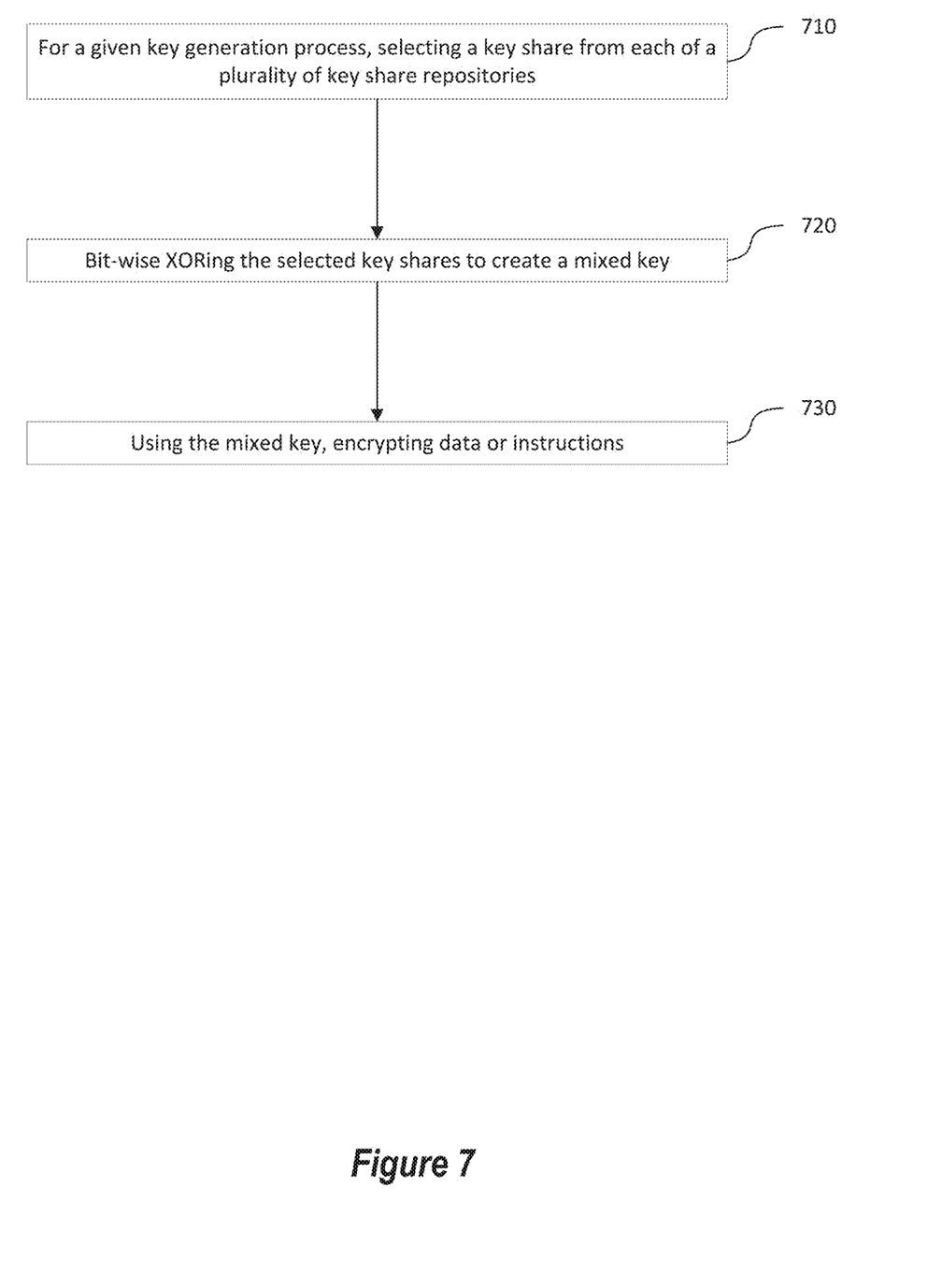
FIG. 7 illustrates a method of encrypting data or instructions using a key generation process.

Referring now to FIG. 7, a method 700 is illustrated. FIG. 7 illustrates a method of encrypting data or instructions using a key generation process. The method 700 includes selecting a key share from each of a plurality of key share repositories (act 710). These key shares are bit-wise XORed to create a mixed key (act 720). The mixed key is used to encrypt data or instructions (act 730).

In one embodiment, the key shares may be selected based on a storage address used to store data that is encrypted using the mixed key. Alternatively, the key shares may be selected based on a nonce. The nonce may be provided by a write counter that increments or decrements each time data or instructions are written to memory.

The method may further include selecting between a first key-roll share and a second key-roll share to select a roll share based on a memory pointer for a memory. Bit-wise XORing the selected key shares may cause an intermediate share to be created. This intermediate share is then bit-wise XORed with the roll share to create the mixed key.

Additionally or alternatively, the method may comprise performing a key-roll operation by reading ciphertext from memory using a key created with the second key-roll share XORed with an output of the bit-wise XOR gate. The memory pointer may be incremented, and updated ciphertext may be written back to the memory using a key created with the first key-roll share XORed with the output of the bit-wise XOR gate.

The key-roll manager may be configured to perform a key-roll operation based on a number of writes having been performed or based on the expiration of an amount of time.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

The following illustrates various elements of various possible embodiments.

Clause 1. A system for generating keys, the system comprising: a plurality of share selecting modules each share selecting module comprising a plurality of storage buffers coupled to a selector that, for a given key mixing operation, selects a key share stored in one of the storage buffers; a bit-wise XOR gate coupled to the plurality of share selecting modules, the bit-wise XOR gate configured to bit-wise XOR all of the key shares selected by the share selecting modules for the given key mixing operation to generate a mixed key on an output of the bit-wise XOR gate.

Clause 2. The system of clause 1, wherein the selectors in the plurality of share selecting modules are configured to select key shares based on a storage address used to store data that is encrypted using the mixed key.

Clause 3. The system of any of clauses 1-2, wherein the selectors in the plurality of share selecting modules are configured to select key shares based on a nonce.

Clause 4. The system of any of clauses 2-3, further comprising a write counter, and wherein the nonce is provided by the write counter that increments or decrements each time data or instructions are written to memory.

Clause 5. The system of any of clauses 1-4, further comprising a key-roll selection system coupled to the output of the bit-wise XOR gate through a bit-wise XOR gate (which in some embodiments may be the same XOR gate as the XOR gate as used by the share selecting modules just with different inputs) to XOR the output of the bit-wise XOR gate with the output of the key-roll selection system, the key-roll selection system selecting a roll share by selecting between a first key-roll share and a second key-roll share based on a memory pointer input into the key-roll selection system.

Clause 6. The system of any of clauses 1-5, further comprising a key-roll manager, the key-roll manager configured to perform a key-roll operation by: reading ciphertext from memory using a key created with the second key-roll share XORed with an output of the bit-wise XOR gate; incrementing the memory pointer; and writing updated ciphertext back to the memory using a key created using the first key-roll share XORed with the output of the bit-wise XOR gate.

Clause 7. The system of any of clauses 1-6, wherein the key-roll manager is configured to perform a key-roll operation based on a number of writes having been performed.

Clause 8. The system of any of clauses 1-7, wherein the key-roll manager is configured to perform a key-roll operation based on expiration of an amount of time.

Clause 9. A method of encrypting data or instructions, the method comprising: for a given key generation process, selecting a key share from each of a plurality of key share repositories; bit-wise XORing the selected key shares to create a mixed key; and using the mixed key, encrypting data or instructions.

Clause 10. The method of clause 9, wherein the key shares are selected based on a storage address used to store data that is encrypted using the mixed key.

Clause 11. The method of any of clauses 9-10, wherein the key shares are selected based on a nonce.

Clause 12. The method of any of clauses 9-11, wherein the nonce is provided by a write counter that increments or decrements each time data or instructions are written to memory.

Clause 13. The method of any of clauses 9-12, further comprising: selecting between a first key-roll share and a second key-roll share to select a roll share based on a memory pointer for a memory; wherein bit-wise XORing the selected key shares causes an intermediate share to be created; and bit-wise XORing the intermediate share and the roll share to create the mixed key.

Clause 14. The method of any of clauses 9-13, further comprising performing a key-roll operation by: reading ciphertext from memory using a key created with the second key-roll share XORed with an output of the bit-wise XOR gate; incrementing the memory pointer; and writing updated ciphertext back to the memory using a key created using the first key-roll share XORed with the output of the bit-wise XOR gate.

Clause 15. The method of any of clauses 9-14, wherein the key-roll manager is configured to perform a key-roll operation based on a number of writes having been performed.

Clause 16. The method of any of clauses 9-15, wherein the key-roll manager is configured to perform a key-roll operation based on expiration of an amount of time.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for generating keys, the system comprising:
    a plurality of share selecting modules each share selecting module comprising a plurality of storage buffers coupled to a selector that, for a given key mixing operation, selects a key share stored in one of the storage buffers,
    wherein the plurality of storage buffers in each share selecting module are configured to store a first key share and a second key share and wherein the selectors are coupled together so as to receive a multi-bit binary number, and each bit in the binary number corresponding to a share selecting module, where each bit in the binary number is used to select the first key share or the second key share in a share selecting module corresponding to the bit; and
    a bit-wise XOR gate coupled to the plurality of share selecting modules, the bit-wise XOR gate configured to bit-wise XOR all of the key shares selected by the share selecting modules for the given key mixing operation to generate a mixed key on an output of the bit-wise XOR gate,
    wherein the selectors in the plurality of share selecting modules are configured to select key shares based on a storage address used to store data that is encrypted using the mixed key, and
    wherein the multi-bit binary number comprising the storage address.

2. The system of claim 1, further comprising a key-roll selection system coupled to the output of the bit-wise XOR gate through a second bit-wise XOR gate to XOR the output of the bit-wise XOR gate with the output of the key-roll selection system, the key-roll selection system selecting a roll share by selecting between a first key-roll share and a second key-roll share based on a memory pointer input into the key-roll selection system.

3. The system of claim 2, further comprising a key-roll manager, the key-roll manager configured to perform a key-roll operation by:
    reading ciphertext from memory using a second key created with the second key-roll share XORed with an output of the bit-wise XOR gate;
    incrementing the memory pointer; and
    writing updated ciphertext back to the memory using a first key created using the first key-roll share XORed with the output of the bit-wise XOR gate.

4. The system of claim 3, wherein the key-roll manager is configured to perform a key-roll operation based on a number of writes having been performed.

5. The system of claim 4, wherein the number of writes is a number of writes that is no more than ½ of the number of writes to wear out the first key.

6. The method of claim 4, wherein the number of writes is a variable number of writes based on nonce preservation operations.

7. The system of claim 3, wherein the key-roll manager is configured to perform a key-roll operation based on expiration of an amount of time.

8. A method of encrypting data or instructions, the method comprising:
    for a given key generation process, selecting a key share at each share selecting module of a plurality of share selecting modules,
    wherein each share selecting module comprises a plurality of storage buffers, where each of the storage buffers is coupled to a selector that, for a given key mixing operation, selects a key share stored in one of the storage buffers, wherein the plurality of storage buffers in each share selecting module are configured to store a first key share and a second key share, wherein the selectors are coupled together so as to receive a multi-bit binary number each bit in the binary number corresponding to a share selecting module, where each bit in the binary number is used to select the first key share or the second key share in a share selecting module corresponding to the bit, wherein the selectors in the plurality of share selecting modules select key shares based on a nonce, wherein the nonce is provided by a write counter that increments or decrements each time data or instructions are written to memory, and wherein the multi-bit binary number comprising the nonce;

bit-wise XORing the selected key shares to create a mixed key; and using the mixed key, encrypting data or instructions.

9. The method of claim 8, further comprising: selecting between a first key-roll share and a second key-roll share to select a roll share based on a memory pointer for a memory;
wherein bit-wise XORing the selected key shares causes an intermediate share to be created; and
bit-wise XORing the intermediate share and the roll share to create the mixed key.

10. The method of claim 9, further comprising performing a key-roll operation by:
reading ciphertext from memory using a second key created with the second key-roll share XORed with an output of the bit-wise XORing;
incrementing the memory pointer; and
writing updated ciphertext back to the memory using a first key created using the first key-roll share XORed with the output of the bit-wise XORing.

11. The method of claim 10, wherein a key-roll manager is configured to perform a key-roll operation based on a number of writes having been performed.

12. The method of claim 11, wherein the number of writes is a number of writes that is no more than ½ of the number of writes to wear out the first key.

13. The method of claim 10, wherein the key-roll manager is configured to perform a key-roll operation based on expiration of an amount of time.

14. A system for generating keys, the system comprising:
one or more processors; and one or more computer-readable media having stored thereon instructions that are executable by the one or more processors to configure the computer system to perform at least the following:
for a given key generation process, selecting a key share at each share selecting module of a plurality of share selecting modules,
wherein each share selecting module comprises a plurality of storage buffers, where each of the storage buffers is coupled to a selector that, for a given key mixing operation, selects a key share stored in one of the storage buffers, wherein the plurality of storage buffers in each share selecting module are configured to store a first key share and a second key share, wherein the selectors are coupled together so as to receive a multi-bit binary number, where each bit in the binary number corresponding to a share selecting module, where each bit in the binary number is used to select the first key share or the second key share in a share selecting module corresponding to the bit, wherein the selectors in the plurality of share selecting modules select key shares based on a storage address used to store data that is encrypted using the mixed key, and wherein the multi-bit binary number comprising the storage address;

bit-wise XORing the selected key shares to create a mixed key; and using the mixed key, encrypting data or instructions.

15. The system of claim 14, wherein the one or more computer-readable media further have stored thereon instructions that are executable by the one or more processors to configure the computer system to perform at least the following:
selecting between a first key-roll share and a second key-roll share to select a roll share based on a memory pointer for a memory; wherein bit-wise XORing the selected key shares causes an intermediate share to be created; and
bit-wise XORing the intermediate share and the roll share to create the mixed key.

16. The system of claim 15, wherein the one or more computer-readable media further have stored thereon instructions that are executable by the one or more processors to configure the computer system to perform a key-roll operation by performing at least the following:
reading ciphertext from the memory using a second key created with the second key-roll share XORed with an output of the bit-wise XORing; incrementing the memory pointer; and writing updated ciphertext back to the memory using a first key created using the first key-roll share XORed with the output of the bit-wise XORring.

17. The system of claim 16, wherein the one or more computer-readable media further have stored thereon instructions that are executable by the one or more processors to configure the computer system to perform the key-roll operation based on a number of writes having been performed.

18. The system of claim 16, wherein the one or more computer-readable media further have stored thereon instructions that are executable by the one or more processors to configure the computer system to perform the key-roll operation based expiration of an amount of time.

19. The system of claim 17, wherein the number of writes is a number of writes that is no more than ½ of the number of writes to wear out the first key.

* * * * *